United States Patent
Kelkhoff et al.

(10) Patent No.: US 6,940,240 B2
(45) Date of Patent: Sep. 6, 2005

(54) MOVABLE BARRIER OPERATOR MULTI-TECHNIQUE EXCESS FORCE AVOIDANCE APPARATUS AND METHOD

(75) Inventors: Barbara P. Kelkhoff, Aurora, IL (US); James J. Fitzgibbon, Batavia, IL (US); Colin B. Wilmott, Buffalo Grove, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 98 days.

(21) Appl. No.: 10/447,664

(22) Filed: May 29, 2003

(65) Prior Publication Data

US 2004/0239275 A1 Dec. 2, 2004

(51) Int. Cl.[7] .............................. H02P 1/00; H02P 7/10; G05B 5/01
(52) U.S. Cl. ...................... 318/282; 318/286; 318/466; 318/468; 318/471; 318/432; 318/433; 49/28; 49/31
(58) Field of Search ................................. 318/264, 266, 318/66, 280, 282, 265, 434, 445–479; 49/26–28, 31, 138; 160/293.1, 310

(56) References Cited

U.S. PATENT DOCUMENTS

| | | | |
|---|---|---|---|
| 3,989,991 A | | 11/1976 | Brennen et al. |
| 4,408,146 A | | 10/1983 | Beckerman |
| 4,625,291 A | * | 11/1986 | Hormann ..................... 702/41 |
| 4,638,433 A | * | 1/1987 | Schindler .................... 700/90 |
| 4,831,509 A | * | 5/1989 | Jones et al. .................. 700/90 |
| 5,929,580 A | * | 7/1999 | Mullet et al. ............... 318/466 |
| 6,078,249 A | | 6/2000 | Slavik et al. |
| 6,107,765 A | * | 8/2000 | Fitzgibbon et al. ......... 318/266 |
| 6,111,374 A | * | 8/2000 | Fitzgibbon et al. ......... 318/282 |
| 6,340,872 B1 | * | 1/2002 | Fitzgibbon et al. ............ 318/9 |
| 6,806,665 B2 | * | 10/2004 | Fitzgibbon et al. ......... 318/282 |
| 2003/0076062 A1 | * | 4/2003 | Mullet et al. ............... 318/445 |
| 2003/0210005 A1 | * | 11/2003 | Murray ....................... 318/286 |
| 2004/0032232 A1 | * | 2/2004 | Murray et al. .............. 318/434 |

* cited by examiner

Primary Examiner—David Martin
Assistant Examiner—Eduardo Colon Santana
(74) Attorney, Agent, or Firm—Fitch, Even, Tabin & Flannery (57) ABSTRACT

A movable barrier operator can use (11) a first technique to prevent an excess application of force during controlled movement of a movable barrier (43) and at least a second technique (12) to similarly prevent an excess application of force during such movement. Both techniques can then be utilized to determine (13) when an application of excess force may nevertheless occur and not be reasonably avoided. In one embodiment, two techniques (21 and 22) can be used to detect force as applied during movement of the movable barrier and such information can be used to determine (23) whether applied force is being reliably indicated. In another embodiment, travel limit information (51), travel information (52) and travel history information (53) are utilized to assess whether normal operation of the movable barrier operator should be over-ridden (54) due to a possibly expression of undue force.

25 Claims, 4 Drawing Sheets

MOVABLE BARRIER OPERATOR MULTI-TECHNIQUE EXCESS FORCE AVOIDANCE APPARATUS AND METHOD

TECHNICAL FIELD

This invention relates generally to movable barrier operators and more particularly to the avoidance of an excess application of force when moving a corresponding movable barrier.

BACKGROUND

Movable barriers of various kinds are known in the art, including but not limited to horizontally and vertically sliding barriers, vertically and horizontally pivoting barriers, single-piece barriers, multi-piece or segmented barriers, partial barriers, complete barriers, rolling shutters, and various combinations and permutations of the above. Such barriers are typically used to control physical and/or visual access to or via an entryway (or exit) such as, for example, a doorway to a building or an entry point for a garage.

In many cases, a motor or other motion-imparting mechanism is utilized to effect selective movement of such a movable barrier. A movable barrier operator will then usually be utilized to permit control of the motion-imparting mechanism. In some cases a user may control the movable barrier operator by assertion of one or more control surfaces that are physically associated with the movable barrier operator. In other cases such control can be effected by the transmission of a wireless remote control signal to the movable barrier operator.

Such movable barrier operators often serve in part to monitor a parameter that corresponds to force as is applied when moving such a movable barrier. On the one hand, it is desirable to supply sufficient force to ensure that the movable barrier will be able to successfully traverse its entire travel path. This can require, in turn, the need to apply a temporary increase in force in order to permit the movable barrier to move through areas that, for a variety of possible reasons, present greater resistance to movement of the movable barrier. On the other hand, a moving movable barrier can potentially come into contact with an obstacle. When an obstacle occasions resistance to movement of the movable barrier, significantly increasing applied force can potentially lead to damaging the movable barrier, the obstacle, or both. Consequently, many movable barriers closely monitor applied force in order to ascertain when a potentially inappropriate level of force is being applied to thereby permit a safe response.

Notwithstanding the above, even in a system that closely monitors applied force, there nevertheless still exists a desire to detect potential problems within the system to thereby provide even further assurances of safe and effective operation of the movable barrier operator.

BRIEF DESCRIPTION OF THE DRAWINGS

The above needs are at least partially met through provision of the movable barrier operator multi-technique excess force avoidance apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a movable barrier operator uses a first technique to prevent an excess application of force at least a first predetermined potential movable barrier operator position and further uses at least a second technique (which second technique is preferably different from the first technique) to again prevent an excess application of force at the first predetermined potential movable barrier operator position. Both techniques are then used to assess whether the movable barrier operator will reliably avoid application of excess force at the first predetermined potential movable barrier operator position. When true, the movable barrier operator will operate in a normal fashion. When not true (meaning that an excess application of force may not be reliably avoided) the movable barrier operator will instead take a predetermined action. In a preferred embodiment, such a predetermined action can include, for example, halting movement of a moving movable barrier and/or reversing the direction of movement of the moving movable barrier. In other embodiments, the predetermined action can include (additionally or as a segregated action) the provision of an alarm.

Pursuant to one approach, the movable barrier operator uses a first technique to detect force as is likely applied with respect to selective movement of a movable barrier to provide a first detected force result and a second technique (which is preferably different from the first technique) to again detect such force. The resultant detected force results are then assessed to determine whether the movable barrier operator will likely have available a reliable indication of the applied force during normal operation. When true, normal operation ensues and/or continues. When false, the movable barrier operator effects a corresponding predetermined action. One controller or multiple controllers can be utilized to embody this approach.

Pursuant to another approach, at least two controllers are provided. Both controllers receive travel limit information (as relates, for example, to an upper position limit for the movable barrier, a lower position limit, or both) and both controllers also receive movable barrier travel information (as provided, for example, by a revolutions per minute sensor that operably couples to motor that drives movement of the movable barrier). In addition, this approach maintains a history of previous movable barrier travels and preferably makes this information available to at least the second controller. So configured, the first controller uses the travel limit information and the movable barrier travel information when selectively causing the movable barrier to move from a first position to a second position (such as, for example, from a fully opened position to a fully closed position). The second controller uses the travel limit information, the movable barrier travel information, and the history of previous movable barrier travels to determine whether and when movement of the movable barrier by the first controller should be over-ridden. For example, in a preferred approach, the second controller determines when a present confluence of the travel information and the travel limit information is inconsistent with the history of previous movable barrier travels (with a sufficient degree of inconsistency being used to determine that the movable barrier operator cannot sufficiently ensure that an excess application of force will be avoided should an operational mishap occur).

Figure 1:
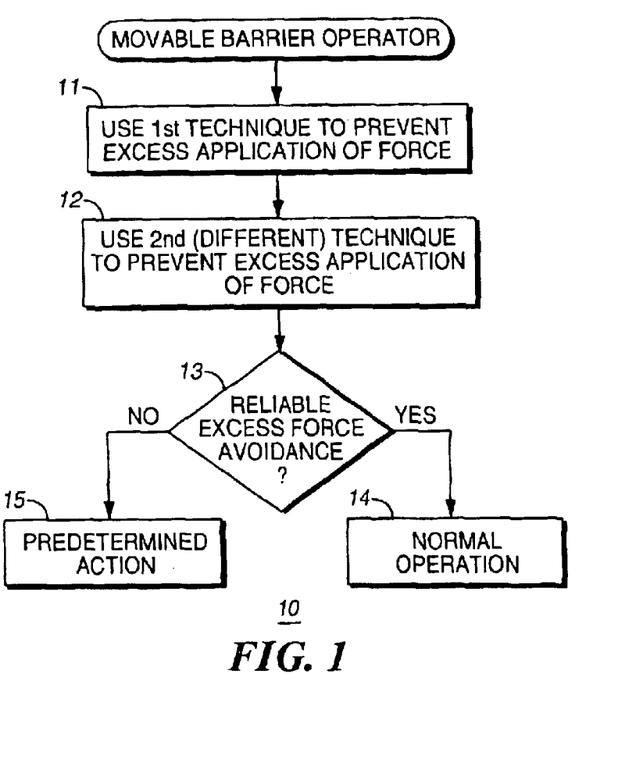
FIG. 1 comprises a general overview flow diagram as configured in accordance with various embodiments of the invention.

Referring now to the drawings, and in particular to FIG. 1, pursuant to these various embodiments a movable barrier operator pursues a process 10 that uses 11 a first technique to prevent the excess application of force and that uses 12 a second technique (which is preferably different from the first technique) to also prevent an excess application of force during controlled movement of a corresponding movable barrier. As described below in more detail, a wide variety of techniques can be accommodated and utilized in this fashion. In a preferred embodiment, both techniques are essentially integral to the movable barrier operator itself (that is, although remote and/or otherwise peripheral sensing platforms can be utilized where desired or appropriate, the sensing mechanisms will preferably be configured more integrally to the movable barrier operator platform itself). The process 10 then determines 13 whether, based upon the first and second technique, the movable barrier operator can likely reliably avoid an instance of excessive application of force. When an excess application of force can likely be avoided, the process 14 permits or otherwise effects normal operation of the movable barrier operator. When an application of excessive force cannot be reliably avoided, however, the process 10 will effect at least one corresponding predetermined action 15.

Figure 2:
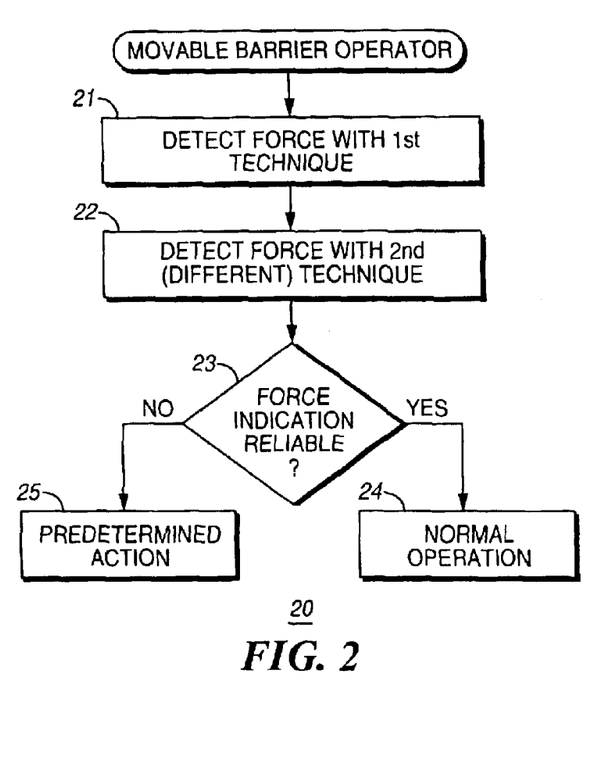
FIG. 2 comprises a flow diagram as configured in accordance with an embodiment of the invention.

Referring now to FIG. 2, a first more detailed embodiment includes a movable barrier operator process 20 that detects 21 force as is likely applied with respect to selective movement of a moveable barrier using a first technique while also detecting 22 such force through application of a second technique that is preferably different than the first technique. In one embodiment, one or both of these techniques detect force as is likely being presently applied to selectively move the movable barrier. The process 20 then uses the detected force results as obtained through these two techniques to assess 23 whether the movable barrier operator likely has available a reliable indication of the force being applied to move the movable barrier. Normal operation 24 results when force is reliably sensed, while an appropriate predetermined action 25 can follow a contrary determination.

Figure 3:
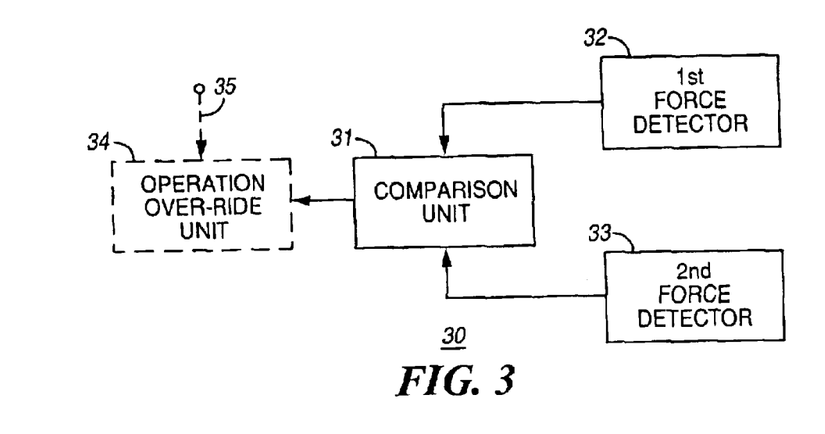
FIG. 3 comprises a block diagram as configured in accordance with an embodiment of the invention.

FIG. 3 generally depicts the relevant portions of a movable barrier operator 30 that can serve to effect such a process. A comparison unit 31 operably couples to a first force detector 32 and a second force detector 33 wherein the first detector 32 detects applied force in accord with a first methodology and the second detector 33 detects applied force in accord with a second, different methodology. Such force detectors can be based upon any of a wide variety of relevant sensing criteria, including but not limited to:

revolutions per a given time period of a rotating member of a movable barrier operator motor;

time between pulses of a revolutions per minute sensor;

elapsed time as occurs between specific positions of the movable barrier during movable barrier travel (including but not limited to elapsed time as occurs between a movable barrier travel limit and an intermediate pass point, elapsed time as occurs between an intermediate pass point and a movable barrier travel limit, elapsed time as occurs between at least two intermediate pass points, or elapsed time as occurs between sensed indicia of absolute position, to name a few);

observed change in impedance of a positional potentiometer;

back electromotive force as produced by a movable barrier operator direct current motor;

elapsed time as occurs between instances of movable barrier operator motor brush switching events;

elapsed time as occurs between movable barrier operator motor slippage events; and mechanical clutch slippage.

So configured, the comparison unit 31 can compare the force results as provided by the two force detectors 32 and 33 with one another (as an alternative, multiple force measurements can be taken through use of multiple force detection techniques while only using a single sensor to obtain such measurements; in such an embodiment, these multiple results are still compared by the comparison unit 31 with one another) and then, for example, compare the resultant differential against one or more thresholds. The magnitude of the threshold can be set as small or as large as appropriate to suit the desired degree of performance sensitivity. Multiple thresholds can be provided to permit, for example, a dynamic utilization of varying thresholds to thereby track, for example, predictable or dynamically sensed changing operational conditions or parameters.

As noted above, these processes permit or effectuate a predetermined action upon determining that applied force may not be reliably sensed. To support such a predetermined action, the comparison unit 31, upon detecting potentially unreliable force sensing conditions (as may be deduced, for example, when the differential between the sensed applied force from the first and second detectors 32 and 33 exceeds a predetermined relevant threshold) can issue a signal that can serve to automatically halt present movement of the corresponding movable barrier and/or to automatically reverse present movement of the movable barrier. If desired, an optional operation over-ride unit 34 can be operably coupled to the comparison unit 31 and can serve to effect such a predetermined action. So configured, this operation over-ride unit 34 will respond to an indication from the comparison unit 31 regarding unacceptable measured force unreliability by itself sourcing a predetermined action output 35.

Such a comparison unit 31 and operation over-ride unit 34 can be embodied in a variety of ways that are well understood in the art. For example, these can be configured as standalone dedicated components within the movable barrier operator or either or both can be configured more integrally. Furthermore, such components can be provided through use of a single-purpose dedicated platform or through appropriate programming of a programmable platform. Such a programmable platform can be, for example, the main controller for the movable barrier operator or can be a secondary controller serving a watchdog role over the operation and behavior of the primary controller.

Figure 4:
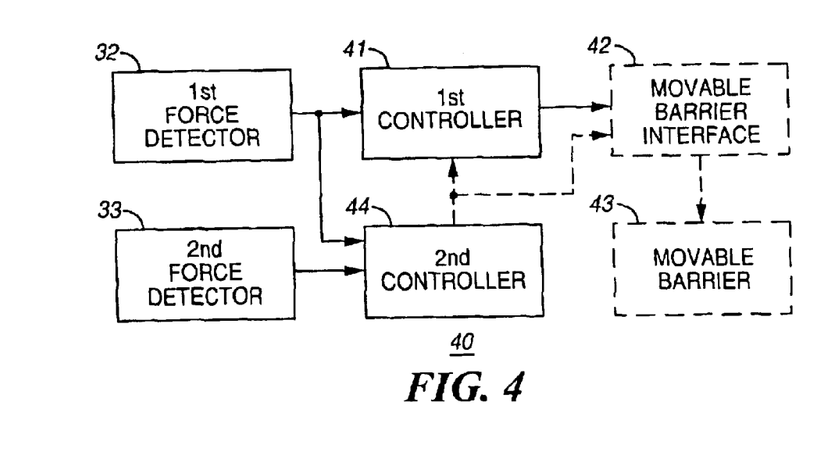
FIG. 4 comprises a block diagram as configured in accordance with an embodiment of the invention.

Reference will now be made to FIG. 4 to illustrate one example of a two-controller movable barrier operator 40. In this embodiment, the movable barrier operator 40 includes at least a first controller 41 and a second controller 44. In this embodiment, the first force detector 32 operably couples to both the first controller 41 and the second controller 44, while the second force detector 33 operably couples to only the second controller 44 (if desired, of course, the second force detector 33 could also be coupled to the first controller 41). So configured, the first controller 41 serves to control a movable barrier 43 via a movable barrier interface 42 in accordance with well understood prior art technique. As part of this ordinary and normal mode of operation, the first controller 41 receives applied force information from the first force detector 32 and utilizes that information to proactively avoid an excessive application of force during controlled movement of the movable barrier 43 (again as well understood in the art).

The second controller 44 serves, in this embodiment, to utilize the information from the first and second force detectors 32 and 33 to ascertain whether the movable barrier operator 40, and in particular the first controller 41, is likely receiving reliable substantially current (or recently applied) applied force information. In this embodiment, the second controller 44 does not serve to determine whether force as being applied at any given point in time is, in fact, excessive. Rather, the second controller 44 serves to determine whether the first controller 41 is likely receiving information reliable enough to permit likely valid determinations in this regard. (If desired, of course, the second controller 44 could also be configured to itself monitor for an excessive application of force, and such a determination could serve as a redundant back-up or point of comparison to the activities of the first controller 41.) (As noted earlier, it would also be possible to use only a single sensor in conjunction with two different force ascertainment techniques to provide the force information to the first and second controllers 41 and 44. Such alternative approaches to providing force information should clearly be understood to be within the ambit of these embodiments.)

So configured, such a movable barrier operator 40 can readily (and even substantially continually) utilize two differing approaches that both respond to an application of force to a movable barrier to ascertain whether force is being reliably detected. For example, if the relative magnitude of force as sensed by both approaches differs considerably as between the two approaches, a conclusion may reasonably be drawn that at least one of those resultant force measurements is likely wrong. This significant difference can then be used to passively inform the first controller 41 of this condition or to actively cause the first controller 41 and/or the movable barrier interface 42 (and/or a relevant coupling link as may be disposed there between) to begin functioning in accord with a specific predetermined precautionary action. The amount of difference that is sufficient to trigger such a response can be selected as appropriate to the needs and requirements of a given setting and intended or expected application.

Figure 5:
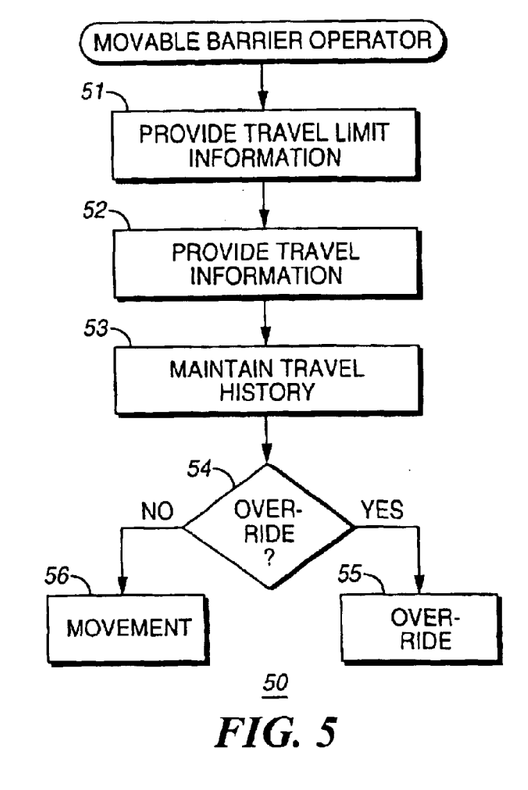
FIG. 5 comprises a flow diagram as configured in accordance with another embodiment of the invention.

Referring now to FIG. 5, pursuant to another embodiment, a movable barrier operator process 50 can provide 51 travel limit information (such as, for example, upper travel limit information that corresponds to a fully opened position for a movable barrier and/or lower travel limit information that corresponds to a fully closed position for the movable barrier) and travel information 52 (such as a present direction of movement and/or a present speed and/or acceleration of movement of the movable barrier).

In addition, this process collects and retains 53 travel history information regarding movable barrier travel. For example, this history can contain partial or complete information regarding a distance (or distances) traversed by the movable barrier when moving to a specified position (such as a fully opened or a fully closed position) during one or more prior travel events. Such a history can be maintained as one or more discrete records with each record corresponding to a particular travel event. As one of many other possible alternatives, this history could also be maintained as an average of a plurality of prior travel events.

It may be appropriate to clear such travel history information from time to time, either in part or in totality. For example, history that reflects travel behavior beyond a predetermined threshold number of travel cycles can be discarded (or more lightly weighted in comparison to more current information). As another example, when force limits are re-adjusted (either via a user or via an automatic dynamic adjustment process as is well understood in the art) it may be appropriate to adjust, partially delete, or fully delete previously stored or developed travel history information. As an illustration, whenever a limit switch is set by a user or whenever a force limit is otherwise established, re-established, or modified pursuant to an initialization or dynamic learning mode of operation the history information can be cleared or modified as appropriate.

The process 50 then utilizes this travel limit information, travel information, and travel history information to determine 54 whether to over-ride ordinary operation of the movable barrier operator. For example, when a present confluence of the travel information and the travel limit information is inconsistent with the history of previous movable barrier travels, a risk exists that an excessive amount of force may be applied, because the movable barrier operator may not now be operating with reliable information regarding the position, movement, direction of movement, or other relevant behavior of the movable barrier. The process 50 will, in this embodiment and under such circumstances, over-ride 55 ordinary operation of the movable barrier operator to thereby reflect this heightened-risk condition. When the travel information, the travel limit information, and the historical record are in substantial accord with one another, the process 50 can continue to permit present movement 56 of the movable barrier and/or to otherwise continue to permit ordinary operations by the movable barrier operator.

Figure 6:
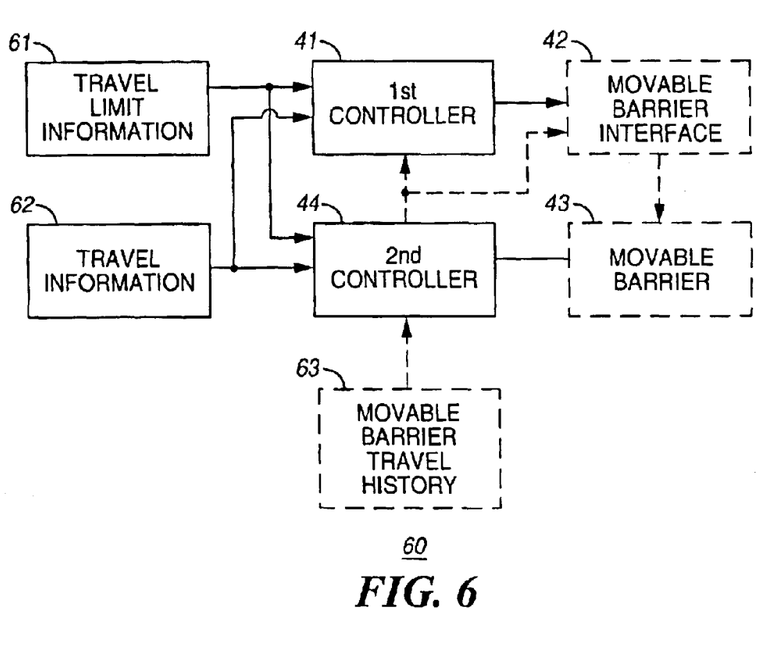
FIG. 6 comprises a block diagram as configured in accordance with another embodiment of the invention.

A movable barrier operator 60 configured to support such a process 50 appears in FIG. 6. Pursuant to this embodiment, a first controller 41 receives both travel limit information 61 and travel information 62 as otherwise noted above and utilizes this information during normal operation of the movable barrier interface 42 (and hence the movable barrier 43). A second controller 44 also receives the travel limit information 61 and the travel information 62 while also having access to movable barrier travel history as described above. Such movable barrier travel history can be retained within the second controller 44 itself or can be retained external to the second controller 44. For example, part or all of the movable barrier travel history could be optionally retained in a separate memory 63 (if desired, of course, such information could be distributed over a plurality of storage platforms as well understood in the art). So configured, the second controller 44 can utilize the travel limit information, the travel information, and the stored information that characterizes prior travels of the movable barrier to determine when, for example, the second controller 44 should over-ride the first controller 41 or should otherwise instruct or influence the activities and functioning of the movable barrier interface 42.

Figure 7:
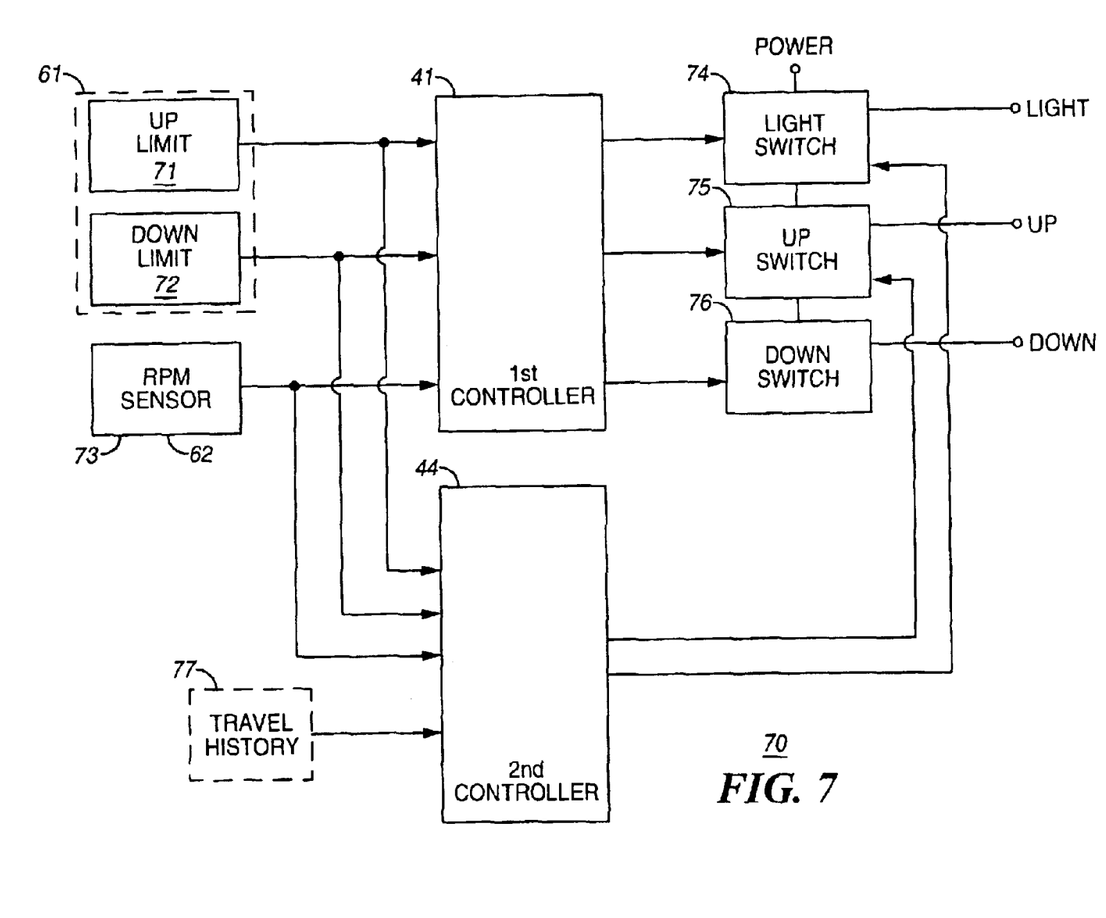
FIG. 7 comprises a block diagram as configured in accordance with another embodiment of the invention.

Referring now to FIG. 7, a more detailed depiction of an illustrative embodiment of this type will be described. The first and second controllers 41 and 44 are preferably comprised of appropriate programmable platforms such as microprocessors or microcontrollers (though other platforms, included hard-wired dedicated platforms, can certainly suffice for these purposes when appropriately configured in accordance with these teachings). Travel limit information 61 comprises, in this embodiment, up limit information 71 (as corresponds to, for example, a fully opened position for a movable barrier that moves at least partially in a vertical direction between a fully opened position and a fully closed position) and down limit information 72 (that corresponds to, for example, that fully closed position). Information regarding other limits of travel (including absolute limits, relative limits, and dynamic limits) can also be utilized as appropriate and as available in a given embodiment. The travel information 62 can be provided through use of, for example, a revolutions per minute sensor 73 that provides such information as pertains to the activity of a motor that is used to effect selective movement of the movable barrier. Again, both the first and second controller 41 and 44 are operably coupled to receive such information.

Using such information, the first controller 41 selectively controls movement of the movable barrier while often also undertaking other activities as well. For example, in this embodiment, the first controller 41 controls a light (not shown) via a light switch 74 (the latter often comprising a transistor controlled relay). For example, the first controller 41 can cause the light to become illuminated whenever the movable barrier is caused to begin moving from a stationary position. In this embodiment, the first controller 41 also provides a controlling output signal to each of an up switch 75 and a down switch 76, wherein these switches couple appropriately to, for example, a movable barrier interface to thereby cause the movable barrier interface to take corresponding actions that will cause the movable barrier to move upwardly and downwardly respectively.

In this embodiment, the second controller 44 couples to receive the up limit information 71, the down limit information 72, the revolutions per minute sensor 73, and also to the travel history repository 77 (presuming that the latter is used when such information is not already sufficiently resident within the second controller 44). Based upon appropriate processing and comparison of such information, the second controller 44 then provides, in this embodiment, over-riding control signals to the light switch 74 and the up switch 75 to cause, for example, the movable barrier interface to begin moving the movable barrier in an upwards direction notwithstanding a contrary signal issuing from the first controller 41 (in a preferred embodiment, the flow of power to the down switch 76 passes through the up switch 75, such that when the latter is "open," power is available to the down switch 76 and conversely, when the up switch 75 is "closed" (as will occur when the second controller 44 provides an over-ride signal as described above), power will be denied to the down switch 76 notwithstanding the provision of a actuation signal from the first controller 41, thereby assuring the over-ride functionality of the second controller 44.

Through these various embodiments it can be seen that a movable barrier operator can reliably operate in a manner that likely avoids an excessive application of force during movement of a movable barrier without necessarily requiring the use of external peripheral force detection and/or obstacle detection mechanisms (though such can be used integral to or in addition to these embodiments as desired). Cost can therefore be reduced while also permitting a reduction in the attending complexities of installing such a system.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising: at a movable barrier operator:
   using a first technique to detect force as is applied with respect to selective movement of a movable barrier to provide a first detected force result;
   using a second technique, which is different from the first technique, to detect the force to provide a second detected force result;
   using the first and second detected force result to assess whether the movable barrier operator has available a reliable indication of the force;
   using the reliable indication of the force during normal operation when the reliable indication of the force is available;
   taking a predetermined action when the reliable indication of the force is not available.

2. The method of claim 1 wherein the first technique is based upon at least one of the following phenomena:
   revolutions per a given time period of a rotating member of a movable barrier operator motor;
   time between pulses of a revolutions per minute sensor;
   elapsed time as occurs between specific positions of the movable barrier during movable barrier travel;
   observed change in impedance of a positional potentiometer;
   back electromotive force as produced by a movable barrier operator direct current motor;
   elapsed time as occurs between instances of movable barrier operator motor brush switching events;
   elapsed time as occurs between movable barrier operator motor slippage events; and
   mechanical clutch slippage.

3. The method of claim 2 wherein the phenomena of elapsed time as occurs between specific positions of the movable barrier during movable barrier travel includes at least one of:
   elapsed time as occurs between a movable barrier travel limit and an intermediate pass point;
   elapsed time as occurs between an intermediate pass point and a movable barrier travel limit;
   elapsed time as occurs between at least two intermediate pass points;
   elapsed time as occurs between sensed indicia of absolute position.

4. The method of claim 1 wherein the first technique and the second technique are each based upon at least one of the following phenomena:
   revolutions per a given time period of a rotating member of a movable barrier operator motor;
   time between pulses of a revolutions per minute sensor;
   elapsed time as occurs between specific positions of the movable barrier during movable barrier travel;

observed change in impedance of a positional potentiometer;

back electromotive force as produced by a movable barrier operator direct current motor;

elapsed time as occurs between instances of movable barrier operator motor brush switching events;

elapsed time as occurs between movable barrier operator motor slippage events; and mechanical clutch slippage.

5. The method of claim 1 wherein using a first technique to detect force includes using the first technique to detect force as is being presently applied to selectively move the movable barrier.

6. The method of claim 1 wherein:

using a first technique to detect force includes using the first technique to detect force as is being presently applied to selectively move the movable barrier;

using a second technique to detect force includes using the second technique to detect force as is being presently applied to selectively move the movable barrier.

7. The method of claim 1 wherein:

using a first technique to detect force includes using a first processing platform to use the first technique; and using a second technique to detect force includes using a second processing platform to use the second technique.

8. The method of claim 7 wherein using a second processing platform to use the second technique includes using a second processing platform to use both the first technique and another technique to detect force as is being presently applied to selectively move the movable barrier.

9. The method of claim 1 wherein using a first technique and using a second technique includes using a first processing platform to use both the first and second technique.

10. The method of claim 1 wherein using the first and second detected force result to asses whether the movable barrier operator has available a reliable indication of the force includes comparing the first and second detected force results with one another.

11. The method of claim 10 wherein comparing the first and second detected force results with one another includes comparing a resultant difference with at least a first threshold.

12. The method of claim 1 wherein taking a predetermined action includes automatically halting movement of the movable barrier.

13. The method of claim 1 wherein taking a predetermined action includes automatically reversing movement of the movable barrier.

14. A method for use by a movable barrier operator comprising:

providing a first and second controller;

providing travel limit information to both the first and second controller;

providing movable barrier travel information to both the first and second controller;

maintaining a history of previous movable barrier travels at the second controller; at the first controller:

selectively causing the movable barrier to move from a first position to a second position, wherein the second position has associated therewith a first travel limit; at the second controller while the first controller selectively causes the movable barrier to move to the second position:

using the travel limit information, the movable barrier travel information, and the history of previous movable barrier travels to determine when movement of the movable barrier by the first controller should be over-ridden by the second controller.

15. The method of claim 14 wherein providing travel limit information includes providing at least one of an upper position limit and a lower position limit.

16. The method of claim 15 wherein providing travel limit information includes providing at least both of an upper position limit and a lower position limit.

17. The method of claim 14 wherein providing movable barrier travel information includes providing information regarding revolutions per a given time period as corresponds to a revolving member of a movable barrier operator motor.

18. The method of claim 14 wherein maintaining a history of previous movable barrier travels includes maintaining a history of a distance traversed by the movable barrier when moving to the second position.

19. The method of claim 14 wherein using the travel limit information, the movable barrier travel information, and the history of previous movable barrier travels to determine when movement of the movable barrier by the first controller should be over-ridden by the second controller includes determining when a present confluence of the travel information and the travel limit information is inconsistent with the history of previous movable barrier travels.

20. A movable barrier operator comprising:

a first force detector having an output comprising a first indication of present force as is being exerted during movement of a movable barrier, which first indication is based, at least in part, upon a first technique to ascertain the present force;

a second force detector having an output comprising a second indication of present force as is being exerted during movement of a movable barrier, which second indication is based, at least in part, upon a second technique to ascertain the present force and which second technique is different from the first technique;

a comparison unit that is operably coupled to the outputs of the first and second force detector and that has a measured force unreliability indicator output.

21. The movable barrier operator of claim 20 and further comprising an operation over-ride unit that is operably responsive to the measured force unreliability indicator output.

22. The movable barrier operator of claim 21 wherein the operation over-ride unit comprises a predetermined action output.

23. The movable barrier operator of claim 20 and further comprising first control means that is operably coupled to the measured force unreliability indicator output for controlling the movable barrier operator pursuant to a first control strategy when the present force is being reliably detected.

24. The movable barrier operator of claim 23 and further comprising second control means that is operably coupled to the measured force unreliability indicator output for controlling the movable barrier operator pursuant to a second control strategy when the present force is not being reliably detected.

25. A method comprising:

at a movable barrier operator:

using a first technique based on a predefined parameter to prevent an excess application of force at least a first predetermined potential movable barrier operator position;

using a second technique, which is different from the first technique, based on predefined parameter to prevent an excess application of force at least the first predetermined potential movable barrier operator position;

using the first and second techniques that are based on the predefined parameter to assess whether the movable barrier operator will reliably avoid an application of excess force at the first predetermined potential movable barrier operator position;

conducting normal operation of the movable barrier operator when the application of excess force will be avoided;

taking a predetermined action when the first and second techniques indicate that the application of excess force may not be avoided.

* * * * *